United States Patent [19]
Dobler et al.

[11] Patent Number: 5,613,754
[45] Date of Patent: Mar. 25, 1997

[54] HEADLIGHT FOR VEHICLES

[75] Inventors: Karl-Otto Dobler, Reutlingen; Gustav Klett, Moessingen; Horst Dahm, Neuhengstett; Rainer Jocher, Aidlingen, all of Germany

[73] Assignees: Robert Bosch GmbH; Mercedes - Benz AG, both of Stuttgart, Germany

[21] Appl. No.: 491,783

[22] Filed: Jun. 19, 1995

[30] Foreign Application Priority Data

Jun. 17, 1994 [DE] Germany .......................... 44 21 354.9

[51] Int. Cl.⁶ .................................................. B60Q 1/06
[52] U.S. Cl. .......................... 362/66; 362/273; 362/280; 362/282; 362/427
[58] Field of Search ........................... 362/66, 273, 275, 362/280–284, 287, 289, 427

[56] References Cited

U.S. PATENT DOCUMENTS

| | | | |
|---|---|---|---|
| 1,197,383 | 9/1916 | Meneely | 362/283 |
| 1,376,237 | 4/1921 | Voss | 362/66 |
| 2,170,552 | 8/1939 | De Porter | 362/280 |

FOREIGN PATENT DOCUMENTS

| | | | |
|---|---|---|---|
| 2493959 | 5/1982 | France | 362/66 |
| 3620800 | 12/1987 | Germany . | |

*Primary Examiner*—Ira S. Lazarus
*Assistant Examiner*—Alan B. Cariaso

[57] ABSTRACT

The headlight has a reflector which is mounted inside a casing for swiveling about a swivel axis extending approximately in a horizontal center plane of the reflector, close to the apex region of the latter. The front edge, pointing in the light emission direction, of the reflector has an at least approximately circular arc shape in planes at right angles to the swivel axis and the center point thereof is arranged at least approximately on the swivel axis. The casing has a part whose edge pointing opposite to the light emission direction adjoins the front edge of the reflector and, in planes at right angles to the swivel axis, likewise has an at least approximately circular arc shape, and whose center point is arranged at least approximately on the swivel axis. Because of this design the gap between the casing part edge and the front edge of the reflector can be kept small, since when the reflector makes a swiveling movement about the swivel axis, the gap varies only slightly or not at all.

19 Claims, 2 Drawing Sheets

HEADLIGHT FOR VEHICLES

BACKGROUND OF THE INVENTION

The present invention relates to a headlight for vehicles.

A headlight known from DE 36 20 800 A1 has a reflector which is mounted on a holder for swiveling about at least one axis. This holder is in the form of a casing inside which the reflector is arranged. The front edge, pointing in the light emission direction, of the reflector is substantially planar and lies in a plane extending at right angles to the optical axis of the reflector. The reflector is swivelable about a swivel axis extending approximately horizontally for the vertical adjustment of the direction of the light beam reflected by the reflector, and is swivelable about a swivel axis extending approximately vertically for the horizontal adjustment of the direction of the light beam reflected by the reflector. The swivel axes are each arranged in edge regions of the reflector. When a swivel movement is made the front edge of the reflector moves both transversely to the optical axis and in the direction of the optical axis, so that it is necessary both that a certain distance exists between the edge of the reflector and the holder, transversely to the optical axis, and that, between the reflector front edge pointing in the light emission direction and an adjoining part of the holder pointing opposite to the light emission direction, a certain distance exists in the direction of the optical axis. These distances can be seen from outside the headlight and in certain circumstances give the impression of inaccurate manufacture and assembly of the headlight.

SUMMARY OF THE INVENTION

Accordingly, it is an object of the present invention to provide a headlight which avoids the disadvantages of the prior art.

In keeping with these objects and with others which will become apparent hereinafter, one feature of the present invention resides, briefly stated, in a headlight for vehicles which comprises a reflector mounted on a holder for swiveling about at least one axis wherein the front edge pointing in a light emission direction and an edge of a part of the holder which points opposite to the light emission direction and adjoining the front edge of the reflector each have curved shape in planes at right angles to a swivel axis of the reflector, the curvatures of the front edge and the edge of the part are designed so that their central points are situated at least approximately on the swivel axis, and between the front edge and the edge of the part a distance is provided which remains at least approximately constant when the reflector makes a swiveling movement about the swivel axis.

When the headlight for a vehicle is designed in accordance with the present invention, it has in contrast the advantage that the distance between the reflector front edge pointing int eh light emission direction and the adjoining part of the holder pointing opposite to the light emission direction can be kept short, since this distance remains at least approximately constant when the reflector makes a swiveling movement about the swivel axis.

In accordance with another embodiment of the present invention, an adjustment device is provided for swiveling of the reflector and has an adjusting element mounted for rotation of the holder and having a portion formed eccentrically to its axis of rotation, the adjusting device also has a transmission element which is mounted for swiveling about an axis on the holder and which is swivelably mounted eccentrically to the swivel axis at least indirectly on the reflector and is coupled to the eccentrically formed portion of the adjusting element in a tangential direction relative to the axis about which the transmission element is swivelable on the holder. The adjustment device enables the installed position of the adjustment element to be coordinated with the arrangement of the swivel axis of the reflector in each individual case, in dependence on the installation conditions of the headlight, so that said element is easily accessible for its operation. The adjustment device is in addition distinguished by compact construction.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings.

DESCRIPTION OF THE PREFERRED EMBODIMENTS

Figure 1:
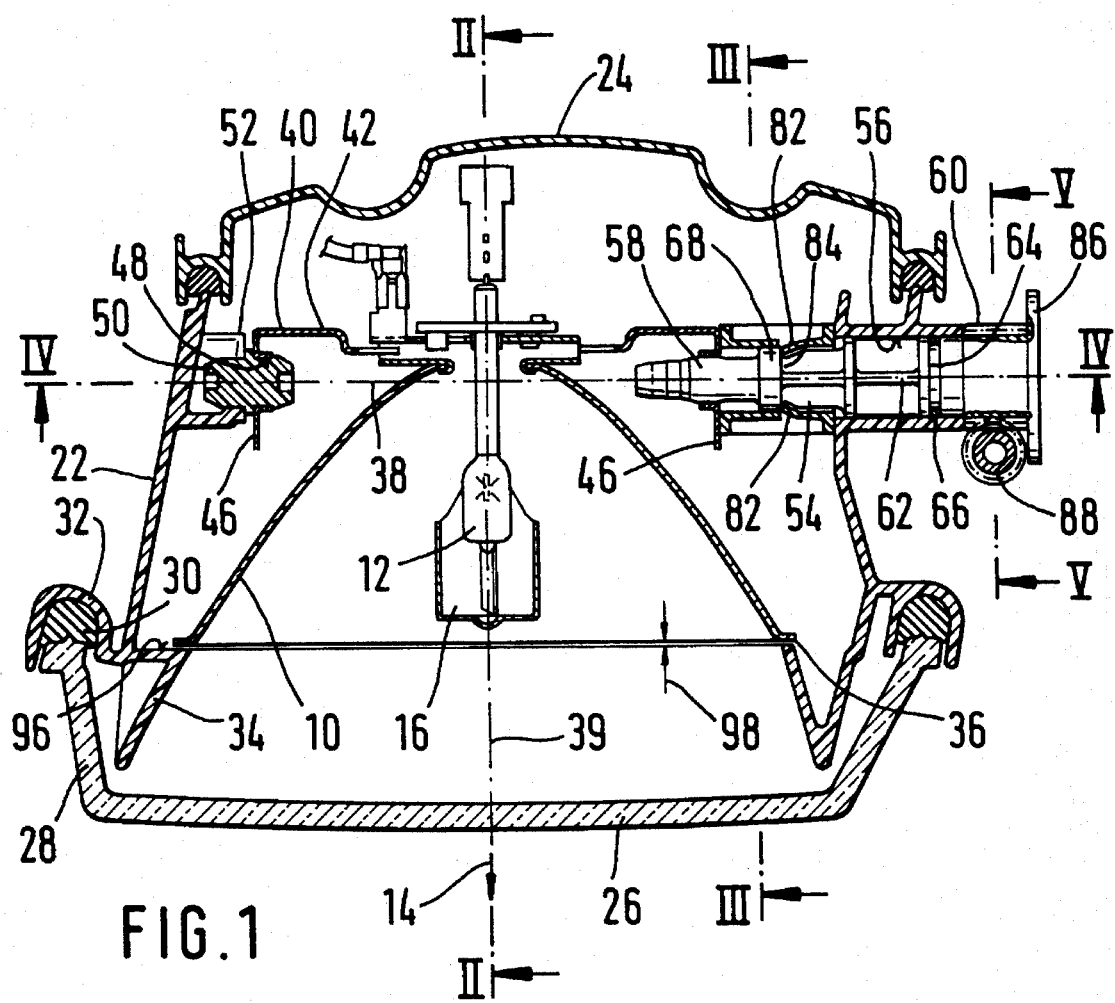
FIG. 1 shows a headlight for vehicles in a horizontal longitudinal section on the line I—I in FIG. 2.
Figure 2:
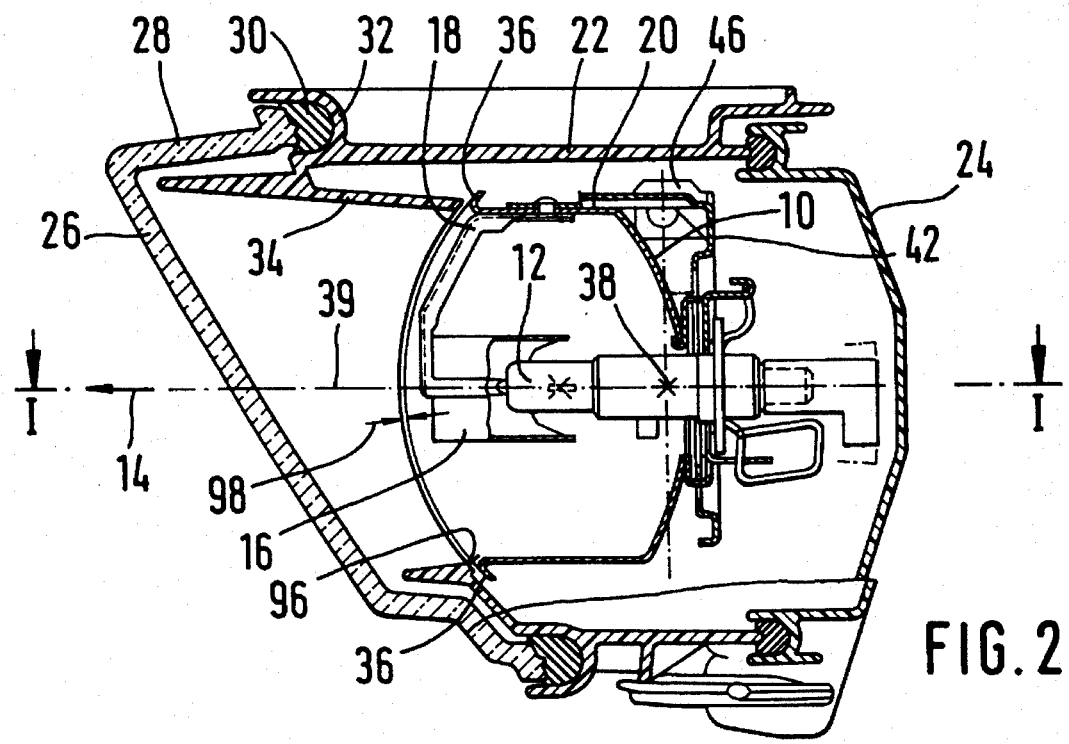
FIG. 2 shows the headlight in a vertical longitudinal section on the line I–II in FIG. 1.

A headlight for vehicles, particularly motor vehicles, which is illustrated in FIGS. 1 to 5, has a reflector 10 into which a light source 12 is inserted. The light source 12 used may be an incandescent lamp or a gas discharge lamp. The reflector 10 is made of sheet metal, but may also be made of any other suitable materials, for example of plastic material. In order to screen light directly emitted by a light source 12 in the light emission direction 14, a screening cap 16 is provided which partly surrounds the light source 12 and which, as shown in FIG. 2, is fastened by means of a bracket 18 to a top wall 20 of the reflector 10. The reflector 10 is adjustably mounted on a holder in the form of a casing 22. On its rear side, pointing opposite to the light emission direction 14, the casing 22 has an opening which can be closed by means of a cap 24 and through which the light source 12 is accessible for replacement purposes. The light emission opening of the casing 22 is closed by a light-transmissive cover disc 26, which may have a smooth surface or be provided with optically active elements. The cover disk 26 has a circumferential rim 28 pointing towards the casing 22 and received in a circumferential groove 30 which is open in the light emission direction 14 and which is formed in a flange 32 projecting outwards on the casing 22. The casing 22 has a portion 34 which is arranged inside the circumferential. rim 28 of the cover disk 26 and which projects beyond the flange 32 in the light emission direction 14 and has a shape tapering opposite to the light emission direction 14. The portion 34 may also be in the form of a separate part connected to the casing 22. The portion 34 may have a conical or curved shape, and its end pointing opposite to the light emission direction 14 has a free cross-section corresponding approximately to the inside surface of the reflector 10 at its front edge 36 pointing in the light emission direction 14, so that light reflected by the reflector 10 can pass out unhindered through the portion 34.

The reflector 10 is arranged inside the casing 22 and is mounted therein for swiveling about an axis 38 extending approximately horizontally. Swivelability of the reflector 10 about a horizontal axis is necessary, for example, for fog lights for motor vehicles in order to permit adjustment of the inclination of the reflector, as prescribed by law. The axis 38 extends approximately in the horizontal longitudinal center plane of the reflector 10 at right angles to the optical axis 39 of the reflector 10 and close to the apex region of the latter. A holding element 40, which is in the form of a holding frame and is arranged in the region of the apex of the reflector 10, is rigidly connected to the latter. As illustrated in FIG. 1, the holding frame 40 comprises a main region 42 which is connected to the reflector 10 and is substantially planar and which extends approximately at right angles to the optical axis 39, and also comprises lateral bearing regions 46 extending approximately parallel to the optical axis 39 of the reflector 10 and pointing in the light emission direction 14. Each of the bearing regions 46 has an opening 48, in which are engaged the ends of bearing elements which by their other ends are mounted in walls of the casing 22. A bearing element 50, shown on the left in FIG. 1, is in the form of a pin, which is mounted in a seat 52 in a side wall of the casing 22. The pin 50 is pressed into the opening 48 and is swivelably mounted in the seat 52. In the opening 48 of the other bearing region 46, on the right in FIG. 1, is engaged an adjustment element 54 which is rotatably mounted in a cylindrical seat 56 in the side wall of the casing 22 opposite the seat 52 and is part of an adjustment device by which the reflector 10 can be swiveled about the axis 38. By means of the bearing element 50 and the adjustment element 54 the holding frame 40, together with the reflector 10, is mounted for swiveling about the axis 38 defined by said elements.

Figure 3:
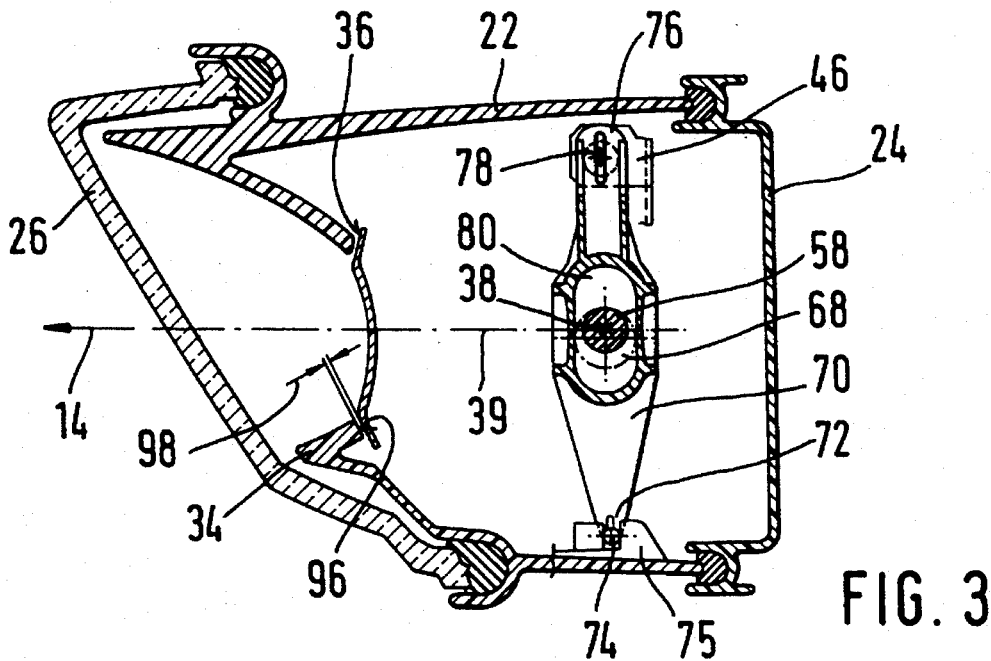
FIG. 3 shows the headlight in a vertical longitudinal section on the line III—III in FIG. 1.

The adjustment element 54 has at its front end a pin-like portion 58 pressed into the opening 48 of the bearing region 46, while its other end 60 projects out of the casing 22. In the seat 56 the adjustment element 54 has a portion 62 which in its outer contour is at least in part circular cylindrical and which is provided with an annular groove 64, between which and the seat 56 a sealing ring 66 is clamped. The pin-like portion 58 and that portion 62 of the adjustment element 54 which is mounted in the seat 56 are arranged coaxially to one another and define the swivel axis 38. The bearing region 46 is arranged at a distance from the inner side of that side wall of the casing 22 in which the seat 56 is formed. Between the seat 56 and the bearing region 46 the adjustment element 54 has a portion 68 which is eccentric to the axis 38. As shown in FIG. 3, the portion 68 has in section at right angles to the axis 38 an at least approximately circular shape and has a diameter such that the adjustment element 54 can be inserted into the seat 56 from outside the casing 22.

As another part of the adjustment device there is arranged in the casing 22 a transmission element 70 which in the exemplary embodiment is two-armed and, in the installed position of the headlight, is arranged with its longitudinal direction approximately vertical. As shown in FIG. 3, the transmission element 70 is mounted in a seat 75 in the casing 22 for swiveling about an axis 74 extending eccentrically to the swivel axis 38 of the reflector 10, the axis 74 extending at least approximately parallel to the swivel axis 38 of the reflector 10. In the exemplary embodiment the axis 74 is arranged in the bottom end region 72 of the transmission element 70. The transmission element 70 is in addition coupled to the holding frame 40, eccentrically to the swivel axis 38 of the reflector 10, for swiveling about an axis 78, the axis 78 extending at least approximately parallel to the swivel axis 38. In the exemplary embodiment the transmission element 70 is coupled in its top end region 76 to a bearing region 46 of the holding frame 40. The swivelable connection of the top end region 76 of the transmission element 70 to the bearing region 46 is made by means of a pin 77 which is arranged on said element and which engages in an opening which is provided in a top region of the bearing region 46 and is arranged approximately vertically above the opening 48, in which the pin-like portion 58 of the adjustment element 54 engages. The transmission element 70 has a recess 80, in which the eccentric portion 68 of the adjustment element 54 is arranged. In the exemplary embodiment the recess 80 is arranged between the end regions 72 and 76 of the transmission element 70. The recess 80 is in the form of an elongated hole which in the radial direction, relative to the axis 74 about which the bottom end region 72 of the transmission element 70 is mounted for swiveling, has a greater length than in the tangential direction relative to the axis 74. The width of the recess 80 in the tangential direction, relative to the axis 74, is made such that the eccentric portion 68 of the adjustment element 54 is rotatably received with slight play in the recess 80 and in the radial direction relative to the axis 74, is translationally movable in the recess 80. The transmission element 70 is thus coupled to the eccentric portion 68 of the adjustment element 54 in the tangential direction relative to the axis 74.

Figure 4:
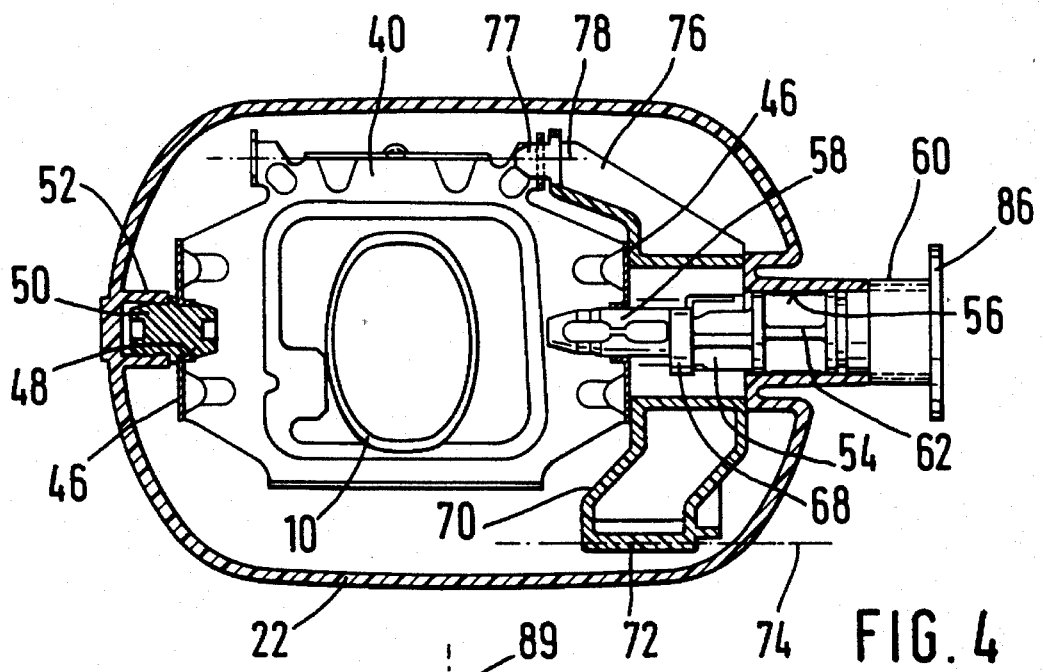
FIG. 4 shows the headlight in a vertical cross-section on the line IV—IV in FIG. 1.

The transmission element 70 is made of plastic material and, as illustrated in FIG. 1, there is integrally formed on it at least one locking arm 82 which is resiliently deflectable transversely to the swivel axis 38 and which engages in a circumferential depression 84 in the adjustment element 54, in the direction of the casing 22, close to the eccentric portion 68 of said element, thereby securing the adjustment element 54 against being pulled out of the casing 22 along the swivel axis 38. In the exemplary embodiment two locking arms 82 are provided, being arranged opposite one another in relation to the swivel axis 38. As illustrated in FIG. 4, the side walls of the casing 22 are given an oval shape, viewed in section at right angles to the optical axis 39, with their curvature pointing outwards, and, in section at right angles to the optical axis 39 the transmission element 70 is approximately U-shaped (lacuna) the curvature of the casing side wall situated next to said element, the end regions 72 and 74 thereof being arranged as limbs extending away from the side wall towards the reflector 10.

Figure 5:
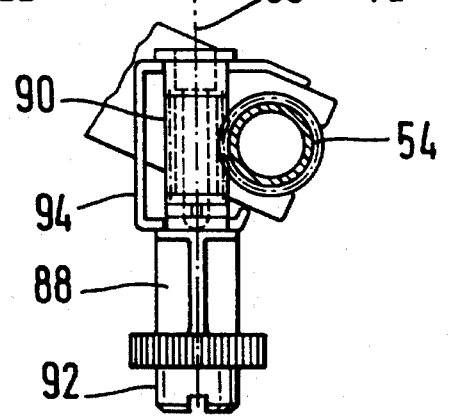
FIG. 5 shows the headlight in a vertical longitudinal section on the line V—V in FIG. 1.

That portion 60 of the adjustment element 54 which is arranged outside the casing 22 is provided over its periphery with worm toothing and, as shown in FIG. 1, a flange 86 having a larger diameter is formed at its end. That portion 60 of the adjustment element 54 which is arranged outside the casing 22 has a larger diameter than the portion 62 arranged in the seat 56, so that between these two portions 60 and 62 a step is provided which forms a stop limiting the movement pushing the adjustment element 54 into the casing 22. As illustrated in FIG. 5, outside the casing 22 there is arranged, as another part of the adjustment device and as actuating element for the adjustment element 54, an adjusting screw 88 having a portion 90 which is provided with a worm or a screw thread and which is in engagement with the worm toothing of the portion 60 of the adjustment element 54. The adjusting screw 88 is arranged at right angles to the swivel axis 38 and therefore to the longitudinal axis of the adjustment element 54, and at its end opposite the worm portion 90 has a head 92, which for example, is provided with a hexagon and/or a cross slot for the application of a tool. The adjusting screw 88 is mounted on a bracket 94, which projects from the outer side of a side wall of the casing 22, for rotation about its longitudinal axis 89 but remains immovable in the direction of its longitudinal axis 89. In the exemplary embodiment illustrated, in the installed position of the headlight the adjusting screw 88 is arranged approximately vertically, with is head 94 pointing downward. However, the adjusting screw 88 can also be arranged in any other positions at right angles to the swivel axis 38, around the portion 60 provided with the worm toothing. In this arrangement the bracket 94 must in each case be arranged accordingly. The arrangement of the adjusting screw 88 can be selected in a manner advantageous for the particular installation conditions of the headlight. The worm toothing of the portion 60 and the adjusting screw 88 form a reduction gear unit, that is to say for a particular angle of rotation of the adjusting screw 88 about its longitudinal axis 89 the adjustment element 54 is turned only through a relatively small angle of rotation about the swivel axis 38.

The front edge 36, pointing in the light emission direction 14, of the reflector 10 is given a curved shape in planes at right angles to the swivel axis 38, the center point of its curvature being situated at least approximately on the swivel axis 38. That edge 96 of the portion 34 of the casing 22 which points opposite to the light emission direction 14 likewise has a curved shape in planes at right angles to the swivel axis 38, the center point of its curvature being situated at least approximately on the swivel axis 38. The curvatures of the front edge 36 of the reflector 10 and of the edge 96 of the portion 34 are at least approximately parallel to one another. Between the front edge 36 of the reflector 10 and the edge 96 of the portion 34 a gap 98 is provided, the curvatures of the front edge 36 of the reflector 10 and of the edge 96 of the portion 34 being so designed that when the reflector 10 makes a swiveling movement about the swivel axis 38 the gap 98 remains at least approximately constant. The front edge 36 of the reflector 10 and the edge 96 of the portion 34 are preferably shaped at least approximately as circular arcs as seen in sections taken at right angles to the swivel axis 38, their center points being situated at least approximately on the swivel axis 38. In this arrangement the edge 96 has a radius exceeding by the size of the gap 98 the radius of the front edge 36. Depending on the size of the gap 98, a certain variation of the curvatures of the edge 96 and of the front edge 36 is possible.

The mode of operation of the adjustment device of the headlight described above is explained below. For an adjustment of the reflector 10 the adjusting screw 88 is turned and, by means of its threaded portion 90 engaging in the worm toothing of the portion 60, in turn brings about a rotation of the adjustment element 54 about the swivel axis 38. On rotation of the adjustment element 54, the eccentric portion 68 of the latter is likewise turned but, because of its eccentric design relative to the swivel axis 38, also makes a movement at right angles to the swivel axis 38 and tangentially to the axis 74 about which the transmission element 70 is swivelable. The tangential component of the movement of the eccentric portion 68 is transmitted to the transmission element 70, in the recess 80 of which the portion 68 is received with slight play in the tangential direction and is thus coupled thereto. The transmission element 70 is thereby swiveled about the axis 74 at its bottom end region 72 mounted in the casing 22. The top end 76 of the transmission element 70 thus makes a swiveling movement about the axis 74, this movement being transmitted to the holding frame 40 through the connection of said element to the latter. The holding frame 40 and the reflector 10 connected to it are mounted by means of the bearing element 50 and the adjustment element 54, and thus make a swiveling movement about the swivel axis 38, so that the path of the optical axis 39 of the reflector 10 is varied in the vertical direction. The inclination of the optical axis 39 of the reflector 10, and therefore that of the light beam reflected by the reflector 10, in the downward direction is at its maximum when the eccentric portion 68 is so arranged that its greatest eccentricity relative to the axis 74 is arranged to be directed tangentially in the light emission direction 14. In this position the top end 76 of the transmission element 70 is situated in the position in which it has been swiveled the farthest in the light emission direction 14. The inclination of the optical axis 39 of the reflector 10, and therefore of the light beam reflected by the reflector 10, in the upward direction is at its maximum when the eccentric portion 68 is so arranged that its greatest eccentricity relative to the axis 74 is arranged to be directed tangentially opposite to the light emission direction 14. In this position the top end 76 of the transmission element 70 is situated in the position in which it has been swiveled the farthest opposite to the light emission direction 14. The swiveling movement of the reflector 10 about the swivel axis 38 is not limited by a stop in any direction, but on the contrary the adjustment element 54 can be turned beyond its extreme positions described above, whereupon adjustment of the reflector 10 is again possible. In the exemplary embodiment illustrated, the eccentric portion 68 of the adjustment element 54 is so arranged inside the recess 80, in its central or zero position, that its greatest eccentricity relative to the swivel axis 38 is directed downward or upward. The adjustment element 54 can be turned through 360 degrees about the swivel axis 38, that is to say beyond its above described positions in which its greatest eccentricity is directed in or oppositely to the light emission direction 14, so that its greatest eccentricity is directed upward. An additional stop for limiting the swiveling movement of the reflector 10 is not necessary, but on the contrary the abovedescribed extreme positions of the eccentric portion 68 of the adjustment element 54 determine end positions of the reflector 10, beyond which the reflector 10 is swiveled back in the other direction when the adjustment element 54 is turned further. An adjustment of the reflector 10 is thus possible, by turning the adjustment element 54, from any angular position of said element. Starting from the adjusting screw 88 the swiveling movement of the reflector 10 about the swivel axis 38 is thus stepped down three times, namely firstly by the stepping-down between the threaded portion 90 and the worm toothing of the portion 60, secondly by the eccentric portion 68 which is coupled to the transmission element 70, and thirdly by the lever ratios of the transmission element 70. The stepping-down between the eccentric portion 68 and the transmission element 70 is determined by the amount of the eccentricity of the portion 68 relative to the swivel axis 38. The lever ratios of the transmission element 70 result from the distances of the ends 72 and 76 of said element from one another and from the point at which the eccentric portion 68 acts. Because of the high step-down ratio the adjustment device described above is self-locking from the adjusting screw 88 to the reflector 10, so that forces acting on the reflector 10, so that forces acting on the reflector 10, for example as the result of vibrations during he running of the vehicle equipped with the headlight, cannot lead to displacement of the reflector 10.

When the reflector 10 makes a swiveling movement about the swivel axis 38, the front edge 38 of the reflector 10 also makes a movement about the swivel axis 38. Because of the abovedescribed design of the front edge 36 of the reflector 10 and of the edge 96 of the portion 34, the gap 98 remains at least approximately constant even when the reflector 10 makes a swiveling movement, and can therefore be kept small.

It will be understood that each of the elements described above, or two or more together, may also find a useful application in other types of constructions differing from the types described above.

While the invention has been illustrated and described as embodied in a headlight for vehicles, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims:

1. A headlight for vehicles, comprising a reflector having a first edge which is a front edge point in a light emission direction; a holder on which said reflector is mounted swivellably about at least one swivel axis and which has a second edge provided on a part of said holder and point opposite to the light emission direction so as to adjoin said first edge; means for swivellably mounting said reflector on said holder, each of said first and second edges having a curved shape in planes at right angles to said swivel axis, said first edge and said second edge having curvatures such that center points of said curvatures are situated at least substantially on said swivel axis, said first edge and said second edge being arranged at such a distance from one another which remains at least substantially constant when said reflector makes a swiveling movement about said swivel axis.

2. A headlight as defined in claim 1, wherein said first edge of said reflector and said second edge of said part of said holder have at least substantially circular arc shape in planes at right angles to said swivel axis.

3. A headlight as defined in claim 2, wherein said second edge of said part of said holder has a greater radius than said first edge of said reflector.

4. A headlight as defined in claim 3, wherein said second edge of said part of said holder has a radius which exceeds a radius of said first edge of said reflector by said distance.

5. A headlight as defined in claim 1, wherein said part of said holder has a shape tapering opposite to the light emission direction.

6. A headlight as defined in claim 1, wherein said part of said holder is formed integrally with a remaining part of said holder.

7. A headlight as defined in claim 1, wherein said reflector has an optical axis, said at least one swivel axis about which said reflector swivels extending close to and substantially at right angles to said optical axis of said reflector.

8. A headlight as defined in claim 1, wherein said swivel axis extends at least substantially in a longitudinal central plane of said reflector.

9. A headlight as defined in claim 1, wherein said holder has a casing inside which said reflector is arranged.

10. A headlight as defined in claim 1; and further comprising an adjusting device provided for swiveling of said reflector, said adjusting device having an adjustment element mounted for rotation on said holder and having a portion formed eccentrically to said swivel axis, said adjusting device also having a transmission element mounted for swiveling about an additional axis on said holder and mounted swivelably and eccentrically to said swivel axis at least indirectly on said reflector, said transmission element being coupled to an eccentrically formed portion of said adjusting element in a tangential direction relative to said additional axis about which said transmission element is swivelable on said holder.

11. A headlight as defined in claim 10, wherein said adjustment element forms a bearing element for said reflector and has an axis of rotation extending at least substantially coaxially to said swivel axis of said reflector.

12. A headlight as defined in claim 10, wherein said eccentric portion of said adjusting element has at least substantially circular shape in a section at right angles to said swivel axis.

13. A headlight as defined in claim 10, wherein said transmission element has a recess in which said eccentric portion of said adjusting element is received.

14. A headlight as defined in claim 13, wherein said recess in a radial direction relative to said additional axis has a greater length than in a tangential direction relative to said additional axis, said eccentric portion of said adjusting element being received in said recess with slight play in the tangential direction relative to said additional axis.

15. A headlight as defined in claim 14, wherein said transmission element in the radial direction relative to said additional axis has a greater length than in the tangential direction relative to said additional axis, and in an installed position of the headlight, said transmission element being arranged so that its longitudinal direction is substantially vertical.

16. A headlight as defined in claim 10, wherein said adjusting element has a portion arranged outside said holder and provided with toothing, said adjusting device having another part formed as an actuating element engaging with said toothing of said portion of said adjustment element, said actuating element and said adjustment element together forming a reduction gear unit.

17. A headlight as defined in claim 16, wherein said toothing of said portion of said adjustment element is a worm toothing, said actuating element having a threaded portion which is in engagement with said worm toothing.

18. A headlight as defined in claim 16, wherein said actuating element has a longitudinal axis and is mounted on an outer side of said holder for rotation about said longitudinal axis, said actuating element being translationally immovable along said longitudinal axis.

19. A headlight as defined in claim 1; and further comprising a holding element connected with said reflector, said reflector being mounted on said holder by said holding element.

* * * * *